(12) United States Patent
Lutzer

(10) Patent No.: US 8,894,009 B2
(45) Date of Patent: Nov. 25, 2014

(54) SEPARATION DEVICE FOR VACUUM TOILET SYSTEMS

(75) Inventor: Wilhelm Lutzer, Zarpen (DE)

(73) Assignee: Airbus Operations GmbH, Hamburg (DE)

( * ) Notice: Subject to any disclaimer, the term of this patent is extended or adjusted under 35 U.S.C. 154(b) by 513 days.

(21) Appl. No.: 13/221,627

(22) Filed: Aug. 30, 2011

(65) Prior Publication Data

US 2012/0048997 A1 Mar. 1, 2012

Related U.S. Application Data

(60) Provisional application No. 61/378,555, filed on Aug. 31, 2010.

(30) Foreign Application Priority Data

Aug. 31, 2010 (DE) .......................... 10 2010 035 912

(51) Int. Cl.
*B64D 11/00* (2006.01)
*B64D 13/00* (2006.01)
*B01D 45/06* (2006.01)
*B64D 11/02* (2006.01)

(52) U.S. Cl.
CPC ............... *B01D 45/06* (2013.01); *B64D 11/02* (2013.01)
USPC ...................................................... 244/118.5

(58) Field of Classification Search
USPC ................ 4/332, 380, 431, 209 FF, 347, 321, 4/209 R; 244/118.5
See application file for complete search history.

(56) References Cited

U.S. PATENT DOCUMENTS

| 3,813,856 A | 6/1974 | Jensen |
| 4,385,912 A | 5/1983 | Parrick et al. |
| 6,681,412 B2 | 1/2004 | Doss et al. |
| 2009/0183633 A1 | 7/2009 | Schiller et al. |

FOREIGN PATENT DOCUMENTS

| DE | 4200298 A1 | 7/1993 |
| DE | 10204248 A1 | 8/2003 |

OTHER PUBLICATIONS

European Patent Office, European Search Report for European Patent Application No. 11178365.0 dated Nov. 4, 2011.
German Office Action for German Application No. 102010035912.2 dated Aug. 12, 2011.

*Primary Examiner* — Valentina Xavier
(74) *Attorney, Agent, or Firm* — Ingrassia Fisher & Lorenz, P.C.

(57) ABSTRACT

A separation device is provided for a vacuum toilet system of an aircraft, which makes possible a significantly simpler type of cleaning, which can be done more quickly, of a profile separator. The movably held combination of a wiping device and the profile separator can carry out a relative movement. As a result of mechanical contact between the wiping device and the profile separator the deposits are removed from the profile separator.

15 Claims, 10 Drawing Sheets

SEPARATION DEVICE FOR VACUUM TOILET SYSTEMS

CROSS-REFERENCE TO RELATED APPLICATIONS

This application claims the benefit of the filing date of German Patent Application No. 10 2010 035 912.2 filed Aug. 31, 2010 and of U.S. Provisional Patent Application No. 61/378,555 filed Aug. 31, 2010, the disclosure of which applications is hereby incorporated herein by reference.

TECHNICAL FIELD

The technical field relates to vacuum toilet technology. In particular, the technical field relates to a separation device for a vacuum toilet system, to a vacuum toilet system, to a method for cleaning a profile separator in a vacuum toilet system, and to an aircraft comprising a vacuum toilet.

BACKGROUND

In known vacuum toilet systems in passenger aircraft, in the connecting line between the wastewater tank and the aircraft environment a filter is installed which may prevent, for example, aerosols being discharged from the wastewater tank to the outside.

In this context, at present, disposable filters or filters that have to be cleaned can be considered. Exchanging disposable filters may result in considerable expenditure to an aircraft operator, while cleaning the filters may merely be an unpleasant and at times also time-consuming task, because as a rule it involves cleaning of a volume filter whose volume needs to be freed of the filtered content. For example, the particles trapped in strainer filters may need to be dislodged in an elaborate manner with ultrasound. The cleaning of these filters may therefore be time-consuming and may thus be associated with expenditure to the aircraft operator. DE 10 204 248 B4 and U.S. Pat. No. 6,681,412 B2 describe, for example, a filter device for a vacuum toilet system with a filter element designed as a PTFE membrane filter.

SUMMARY

Stated are a separation device for a vacuum toilet system of an aircraft, a vacuum toilet system for an aircraft, a method for cleaning a profile separator in a vacuum toilet system of an aircraft, and aircraft according to embodiments of the invention.

The described embodiments equally relate to the separation device, the vacuum toilet system, the method, the use and the aircraft. For example, characteristics which below are described with regard to the separation device may in a corresponding manner also be implemented as characteristics in the vacuum toilet system and in the method, and vice versa. Furthermore, it should be noted that in each of the following exemplary embodiments the process-related steps may be carried out not only in the explicitly mentioned sequence, but also in any other desired sequence, without leaving the scope as set forth by the claims.

According to an embodiment, a separation device for a vacuum toilet system of an aircraft is stated. The separation device comprises a profile separator and a wiping device. In this arrangement the profile separator is designed for separating gaseous from non-gaseous constituent parts of toilet wastewater in the aircraft, and the separation device is designed in such a manner that relative movement between the profile separator and the wiping device is made possible. Furthermore, the separation device is designed in such a manner that as a result of the relative movement, non-gaseous constituent parts deposited on the profile separator are removed from the latter by the wiping device.

With this exemplary embodiment it may be possible to carry out cleaning of the profile separator, which serves as a filter in the vacuum toilet system, in the installation position of the profile separator on a wastewater collection tank. In other words, the profile separator need not be deinstalled and dismantled in order to be cleaned. The mere carrying out and implementation of the relative movement results in the profile separator achieving the desired clean state.

In this arrangement the wiping device can, for example, be a purely mechanical device and can be designed as a carrier, or it can also be designed as a corresponding negative shape or die of the profile separator so that the constituent parts deposited on the profile separator are removed from the latter. However, it may also be possible for the wiping device to comprise electrical components so that the desired relative movement can be electrically controlled and/or regulated. In other words, the profile separator and the separation device mechanically engage each other in such a manner that when the relative movement is carried out the profile separator is cleaned and the constituent parts are mechanically removed, by the wiping device, from the surfaces of the profile separator. In this context, the term "relative movement" may not only relate to a linear movement but also to a rotary movement or to a combination of these two movements.

In this way it may be possible to clean the profile separator in a very short time without there being any need to remove the separation device, for example from the wastewater collection tank of a vacuum toilet system in the aircraft. This may result in a significant reduction in maintenance expenditure as well as in the complete elimination of disposable filters. In other words this separation device is more environmentally friendly than hitherto known ones.

The profile separator provides separation of various substances, for example of aerosols, which may take place by multiple deflection of the flow in a profile labyrinth based on the inertia of the non-gaseous constituent parts of the flow. The non-gaseous constituent parts may not be able to follow the strong deflections; sooner or later they may encounter a wall, to whose surface they will adhere, for example because of their stickiness.

For example, the profile separator may be designed as an arrangement which comprises U-profiles, located side-by-side at a certain distance, with the free limbs of the U-profiles pointing upwards. Opposite the aforesaid, for example, a similar or identical arrangement of U-profiles can be arranged, whose free limbs, for example, point downwards. The profiles are mutually offset in such a manner that in each case above a space in the bottom profile a top profile is arranged. The free limbs of the profiles project into the opening of the opposite profile. This results in a flow channel as shown, for example, in FIG. 4.

In other words, the profile separator is a baffle separator. In order to overcome the barrier, the flow is twice deflected by approximately 180°. Any particles that cannot follow this strong deflection may get caught on the inside of the U-profiles. These are the deposited, non-gaseous constituent parts of the toilet wastewater. In this document the term "U-profile" has been selected to illustrate the principle; analogous arrangements comprising a multitude of other profile types are also possible. For example, various profile types are shown in FIG. 7, FIG. 9 and FIG. 10.

Because of the existing wiping device it is now no longer necessary to elaborately dismantle the profile separator, but according to this exemplary embodiment of the invention it is possible to only carry out the relative movement, as a result of which the deposited non-gaseous constituent parts of the toilet water are removed from the profile separator, in other words the profile separator is being cleaned. For example, it may be possible to slide the profile separator through a precisely fitting die. This die can, for example, be part of the housing of the separation device, or it may be a deinstallable separate component.

In other words, the profile separator is moved from an operating position relative to the wiping device to a cleaning position. The path between these two positions the mechanical intervention between the profile separator and the wiping device removes from the profile separator the deposited constituent parts of the toilet wastewater, which constituent parts have to be removed.

In this arrangement the relative movement may, for example, be implemented in that the wiping device is firmly affixed, for example, to the housing of the separation device, and the profile separator can be moved along a straight line within the housing of the separation device. In this case the profile separator can be pulled from the operating position along this axis, and can subsequently be pushed back into its operating position. This movement is, for example, shown in FIG. 6a thru FIG. 6c.

Furthermore, it may be possible for the wiping device and also for the profile separator to be movably arranged on the separation device, for example on a housing, while they are nevertheless able to move relative to each other. Furthermore, it may be possible for the wiping device to be movably arranged and for the profile separator to be immovably affixed to the separation device. For example, the profile separator may be designed so as to comprise several top profiles and opposing bottom profiles, while the wiping device is designed as a matching die, in other words as a negative shape of the resulting relief. For cleaning the profiles they are pulled to their ends into the die. The accumulated particles are removed from the profiles, and in the application case presently described fall into the wastewater collection tank from which they are also removed the next time the tank is emptied. This method, which can be carried out on this exemplary embodiment of the invention, is clearly illustrated in FIG. 6a thru FIG. 6c. In this and in any other exemplary embodiment the separation device is designed in such a manner that it may mechanically withstand the pressure differentials that occur within a vacuum toilet of an aircraft. The wiping device can, for example, comprise plastic, metal or elastomer. The use of other materials in their production is also possible.

The wiping device preferably rests closely against the profiles of the profile separator or against the profile separator so that it can wipe off as much dirt as possible. However, optimal spacing may be maintained to the effect that any jamming between the profile separator and the wiping device during the wiping action is prevented. Furthermore, a reduced installation height of the wastewater collection tank may be achieved. The required height can, for example, be reduced by means of the present invention in that as a result of simplified cleaning there may be no need to provide space for installation and/or deinstallation of components. Thus, the embodiments result in additional space in the aircraft, which space is economically usable.

According to a further embodiment, the profile separator comprises deposition regions for depositing the non-gaseous constituent parts. The wiping device comprises at least one carrier. Furthermore, during the relative movement mechanical contact is established between the carrier and the deposition regions of the profile separator to remove deposited constituent parts from the profile separator. In other words, the two components of profile separator and wiping device may ensure that mechanical intervention or mutual mechanical contact exists so that during the relative movement the undesirable deposited constituent parts are mechanically removed from the profile separator.

According to a further embodiment, the wiping device, as far as its shape is concerned, is designed as a die relative to the profile separator. In other words, mechanical intervention between the profile separator and the wiping device is established so that direct contact between the profile separator and the wiping device exists. The aforesaid are in touch with each other in a manner similar to a positive shape and a negative shape. In other words, the outer shape of the wiping device matches the shape of the profile separator or matches the relief formed by the profile separator, or matches the flow channel within the profile separator.

According to another embodiment, the separation device comprises a housing. The profile separator and the wiping device are arranged in the housing. For example, this housing can be used for connection to the wastewater collection tank of the vacuum toilet system in the aircraft. For example, it may be possible to design the profile separator or the die as part of this housing. In this case the profile separator may be moved both to the housing and to the die or to the wiping device.

According to a further embodiment, the wiping device forms part of the housing of the separation device or is firmly connected to the housing of the separation device. The profile separator is arranged so as to be slidable relative to the housing and to the wiping device for the purpose of carrying out the relative movement.

This exemplary embodiment, which may be better understood with reference to FIG. 1 and FIG. 6a thru FIG. 6c, may make it possible to clean the profile separator very quickly and to merely carry out the following movements: pulling out and sliding-in the profile separator from/to the wiping device or the die. In this manner a considerable reduction in maintenance expenditure is achieved, as is complete elimination of the disposable filter. In other words, this separation device is more environmentally friendly than hitherto-known ones. In this and in other embodiments a securing device may be used in order to secure the separation device.

According to a further embodiment, the profile separator comprises a profile top part with at least one relief-like surface, and the profile separator comprises a profile bottom part with at least one relief-like surface. The profile top part and the profile bottom part are joined in such a manner that at least one relief-like flow channel is provided. Furthermore, the profile separator may comprise several profile tops and several profile bottoms. This is, for example, illustrated in FIG. 4, in which three U-shaped top profile tops are used and four U-shaped bottom profile bottoms are used. In this manner the flow channel 403 is formed. In other words, the presently described separation device comprises an arrangement of U-profiles that are situated side-by-side at a certain spacing, with the free limbs of said U-profiles for example pointing downwards. The aforesaid represent several profile top parts. Opposite the aforesaid there is a similar or identical arrangement of U-profiles that represent several profile bottom parts. Their free limbs point upwards.

In this arrangement the profile top parts and the profile bottom parts may be offset from each other in such a manner that in each case a profile top is arranged over a space of a profile bottom part. The free limbs of the profile bottom parts project into the openings of the opposite profile tops.

In order to overcome this barrier, the flow is twice deflected, quasi by approximately 180°. The particles that cannot follow this strong deflection get caught on the inside of the U-profiles. These particles may subsequently be removed from the profile separator with the separation device according to the embodiments of the invention. This takes place, for example, by pulling the profile separator from its operating position relative to the wiping device.

According to a further embodiment, the profile top part and the profile bottom part are held only by one end while on the opposite end they are free. The profile top part and the profile bottom part are connected on one end by a rotational axis so that the profile top part and the profile bottom part are arranged so that they can be folded out and folded in. The ability to fold out the profile components may makes possible to additionally clean the profile separator.

According to a further embodiment, the separation device is designed in such a manner that the free ends of the profile top part and the profile bottom part can be pulled through the wiping device so that the relative movement can be carried out. This exemplary embodiment can, furthermore, provide a housing of the separation device, which housing is firmly connected to a wastewater collection tank.

According to a further embodiment, the separation device comprises a handle. The separation device is designed in such a manner that by pulling on the handle the relative movement between the profile separator and the wiping device can be carried out. Furthermore, it may be possible for this handle at the same time to act as a rotational axis for an upper part of the housing of the separation device and a lower part of the housing of the separation device. This exemplary embodiment is, for example, shown in FIG. 8.

According to a further embodiment, a vacuum toilet system for aircraft is stated, which comprises a separation device according to any one of the embodiments described above or below. Furthermore, the vacuum toilet system comprises a wastewater collection tank. The separation device is firmly affixed to a housing of the wastewater collection tank. The profile separator is slidably arranged within the separation device.

According to a further embodiment, the profile separator is secured against unintended movement by means of a quick-locking spring. For operation it may be necessary for the profile separator to be secured because it is not intended to be able to slide to and fro. For example, this may be implemented by means of a screw; however, in order to reduce time spent cleaning, according to an aspect of the invention this locking function may be implemented by means of a quick-locking spring. In this way, again, maintenance times may be reduced.

According to a further embodiment, a method for cleaning a profile separator in a vacuum toilet system of an aircraft is stated. The method involves the following steps: providing a profile separator on a wastewater collection tank of a vacuum toilet system in an aircraft. The profile separator is designed to separate gaseous from non-gaseous constituent parts of toilet wastewater in the aircraft; providing a wiping device; causing relative movement between the profile separator and the wiping device in the installation position of the profile separator and the wiping device so that the wiping device removes the deposited non-gaseous constituent parts from the profile separator.

According to a further embodiment, the process step of causing the relative movement is implemented by the following steps: pulling the profile separator from the wastewater collection tank; concurrent wiping of deposited non-gaseous constituent parts from the profile separator with a mechanical contact between the profile separator and the wiping device; and sliding the profile separator into the wastewater collection tank.

With this embodiment it may be possible to effect cleaning of the profile separator, which serves as a filter in the vacuum toilet system, in the installed position of the profile separator. In other words, the profile separator need not be deinstalled and dismantled in order to be cleaned. The mere carrying out and implementation of the relative movement may result in the profile separator achieving the desired clean state. Further steps can, for example, relate to releasing the safety catch of the separation device. After the profile separator has been slid in, engaging the safety catch of the separation device may be added as a further step.

According to a further embodiment, the use of a separation device in an aircraft according to any one of the preceding or following embodiments is stated.

BRIEF DESCRIPTION OF THE DRAWINGS

The embodiments are described with reference to the following figures, where the illustrations in the figures are diagrammatic and not to scale and the same reference characters are used for identical or similar elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
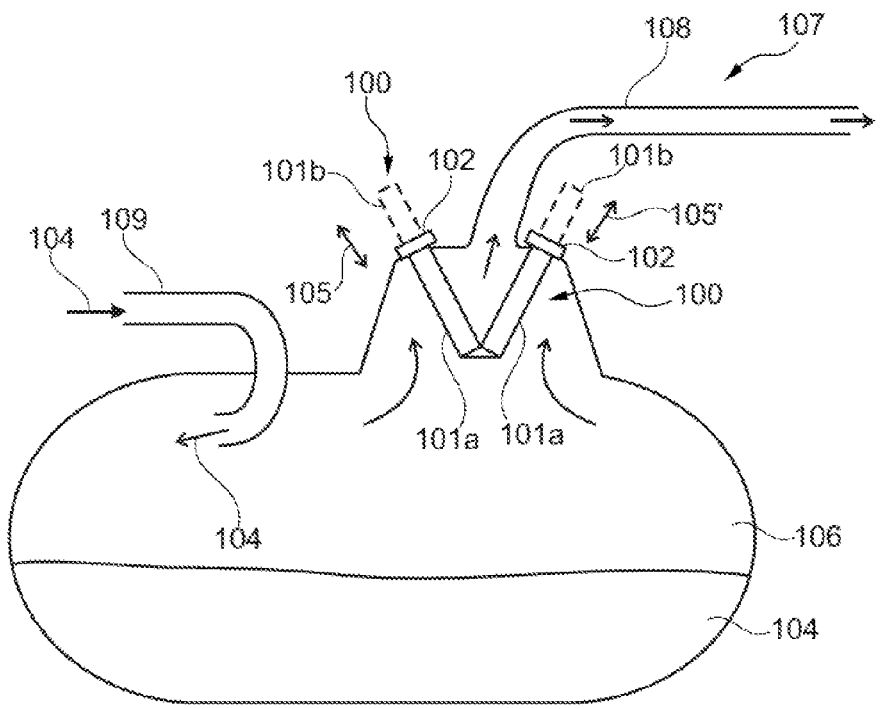
FIG. 1 shows a diagrammatic two-dimensional view of a wastewater collection tank with a separation device according to an embodiment.

FIG. 1 shows a vacuum toilet system 107 for a vacuum toilet system in aircraft. The vacuum toilet system comprises a separation device 100 and a wastewater collection tank 106. The separation device further comprises two profile separators 101, which in each case are shown in solid lines in the operating position 101a, and in dashed lines in the cleaning position 101b. In this arrangement it is, of course, basically also possible to use only one profile separator 101.

Furthermore, the separation device comprises a wiping device 102 for each profile separator. In this arrangement the profile separator is designed to separate gaseous from non-gaseous constituent parts of toilet wastewater 104 in the aircraft. This toilet wastewater 104 is conveyed, by way of feed lines 109, from the vacuum toilet to the wastewater collection tank. After separation of gaseous from non-gaseous constituent parts within the profile separator, air can be fed, through outflow lines 108, from the wastewater collection tank 106, for example to the aircraft skin. In this and in any other exemplary embodiment the separation device may be designed to mechanically withstand the pressure differentials that occur within a vacuum toilet of an aircraft.

Furthermore, the separation device 100 may be designed in such a manner that relative movement, in the diagram indicated by the arrows 105 and 105', between the profile separator and the wiping device is made possible. In the presently shown embodiment the relative movement is a translatory movement of the profile separator 101 relative to the wiping device 102 that is firmly installed on the wastewater collection tank. Furthermore, the separation device is designed in such a manner that when carrying out the relative movement, in other words when the profile separator is pulled from the operating position 101a to the cleaning position 101b, the deposited non-gaseous constituent parts of the toilet water are removed from the profile separator by the wiping device. In other words, the wiping device 102 and the profile separator 101 are made to bring about mutual mechanical engagement in such a way that when the relative movement is carried out the deposits on the profile separator are removed, wherein said deposits fall, for example, into the wastewater collection tank 106 as a result of gravity.

Overall, in this manner the separation of solid materials from liquid materials in the wastewater tank is improved to the effect that the profile separator can be cleaned in a very short time. In this arrangement various profiles in the profile separator can be used for depositing the non-gaseous constituent parts. The profiles can be pulled through the wiping device so that the deposited separable matter is wiped off and falls into the wastewater tank. In other words, the separation device according to this embodiment may be cleaned easily and quickly because it merely requires pulling out the profile separator and subsequent pushing in the profile separator into the wiping device. This may result in a low maintenance effort, and furthermore use of a disposable filter may not be necessary.

Figure 2:
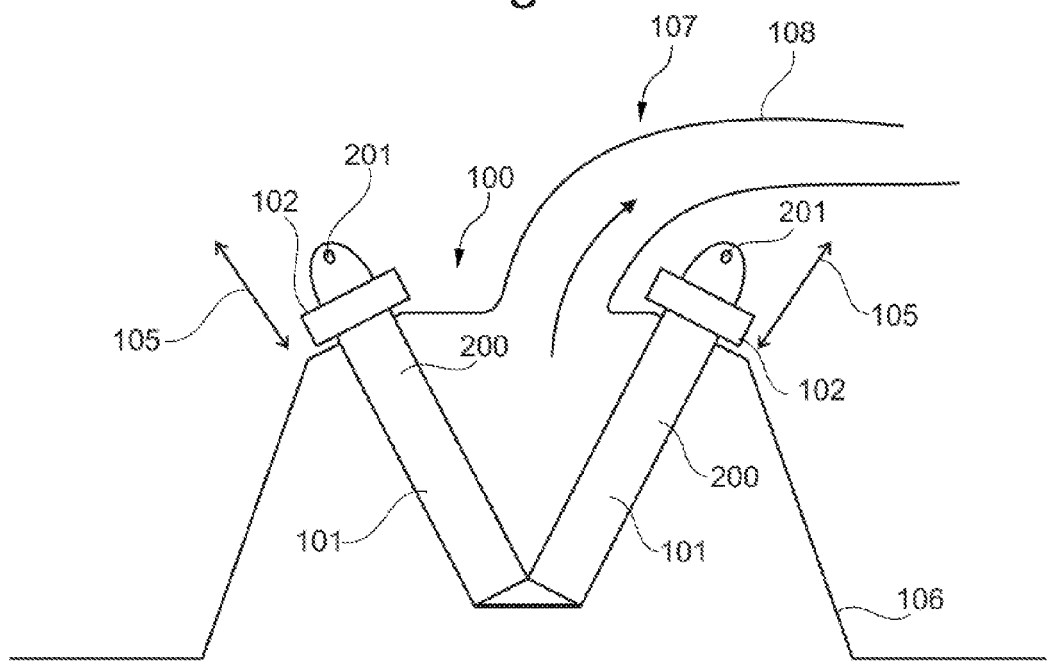
FIG. 2 shows a diagrammatic two-dimensional view of a separation device according to an embodiment.

FIG. 2 shows a further separation device 100 according to a further embodiment of the invention. The separation device together with the wastewater collection tank 106 is part of a vacuum toilet system 107. The separation device 100 in FIG. 2 furthermore comprises a housing 200, which, for example, comprises the profile separator 101. Furthermore, the separation device comprises the wiping device 102 so that when the profile separator 101 is pulled out, the desired cleaning action is achieved by mechanical intervention between the profile separator and the wiping device. In this diagram, pulling out is mentioned as an example of the relative movement 105, which is indicated by the arrow 105. Furthermore, FIG. 2 sows that by means of a rotational axis 201 a profile top and a profile bottom of the profile separator 101 are interconnected. This mechanism is shown in more detail in the following FIG. 3 and FIG. 4.

Figure 3:
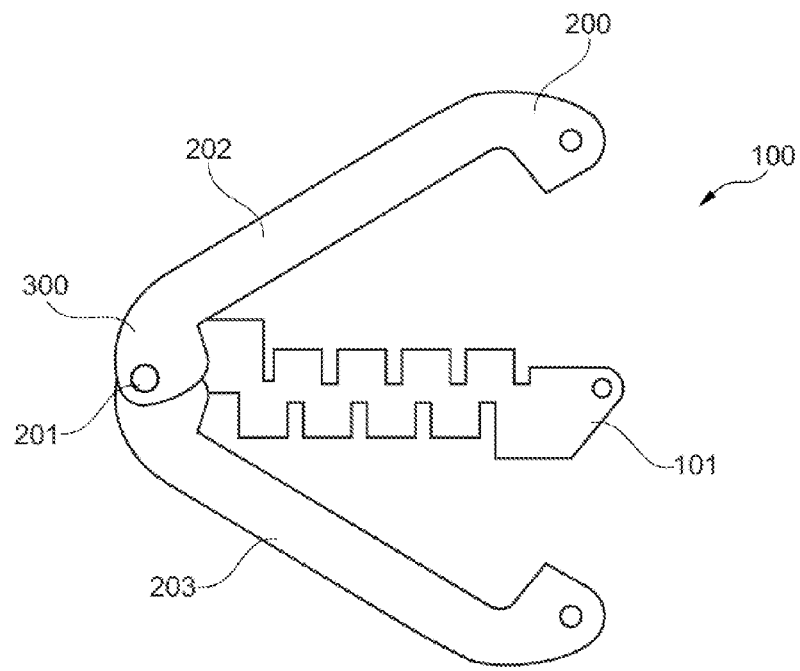
FIG. 3 to FIG. 5 show diagrammatic two-dimensional views of profile separators that form part of a separation device according to an embodiment.

FIG. 3 shows a separation device 100 with a profile separator 101 and a housing 200. In this arrangement the wiping device, which according to each embodiment comprises the separation device, is not shown. Furthermore, the housing 200 is shown which comprises a housing top 202 and a housing bottom 203 so that the housing overall can be folded out and folded in. Both the two housing parts 202, 203 and the profile separator 101 are connected by way of the rotational axis 201. The diagram shows that the profile separator is held only by one end 300, while being free at the opposite end. For example, the profile separator 101 can comprise a profile top and a profile bottom. This is shown in greater detail in FIG. 4.

Figure 4:
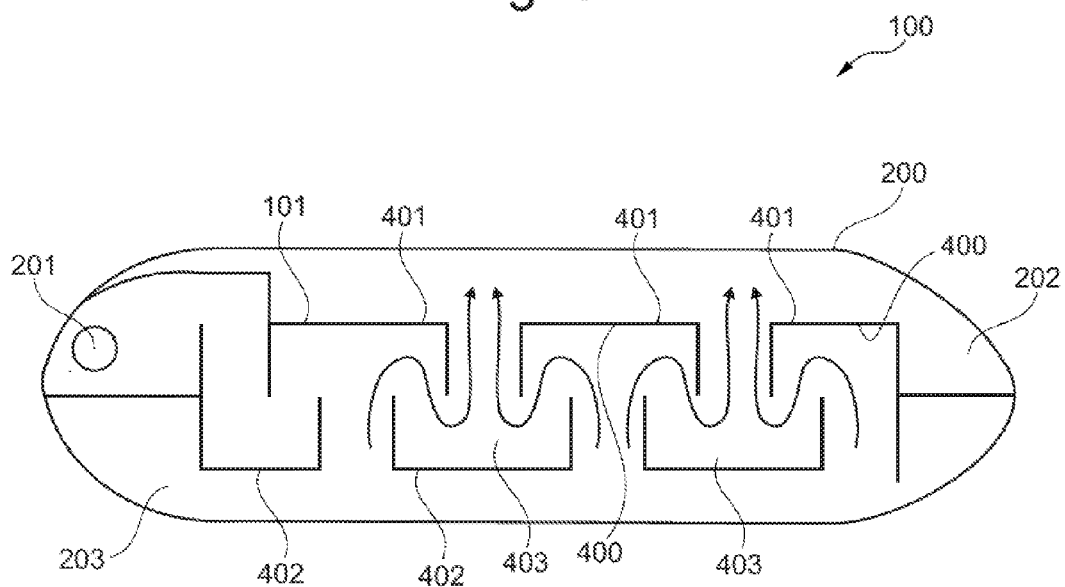

FIG. 4 shows a separation device 100. However, the wiping device 102 is not shown. The wiping device could, for example, correspond to the non-filled-in regions of the flow channel 403 and could rest against the internal walls of the profiles in such a manner that during the relative movement said profiles mechanically remove the deposits from the deposition regions 400.

FIG. 4 shows that the profile separator 101 is held within a housing 200 in its rotational axis 201. The housing in turn comprises an upper housing part 202 and a lower housing part 203. Furthermore, the profile separator comprises deposition regions 400 for depositing the non-gaseous constituent parts, wherein these deposition regions are cleaned with the wiping device according to embodiments of the invention in that the relative movement is carried out.

In this embodiment of the separation device the profile separator is shown to comprise several profile top parts 401 and several profile bottom parts 402. In this arrangement both the profile top parts and the profile bottom parts comprise at least one relief-like surface. In the embodiment presently shown these are U-shaped profile top parts and profile bottom parts. These profile top parts and profile bottom parts are joined in the profile separator in such a manner that at least one relief-like flow channel 403 is provided.

Figure 5:
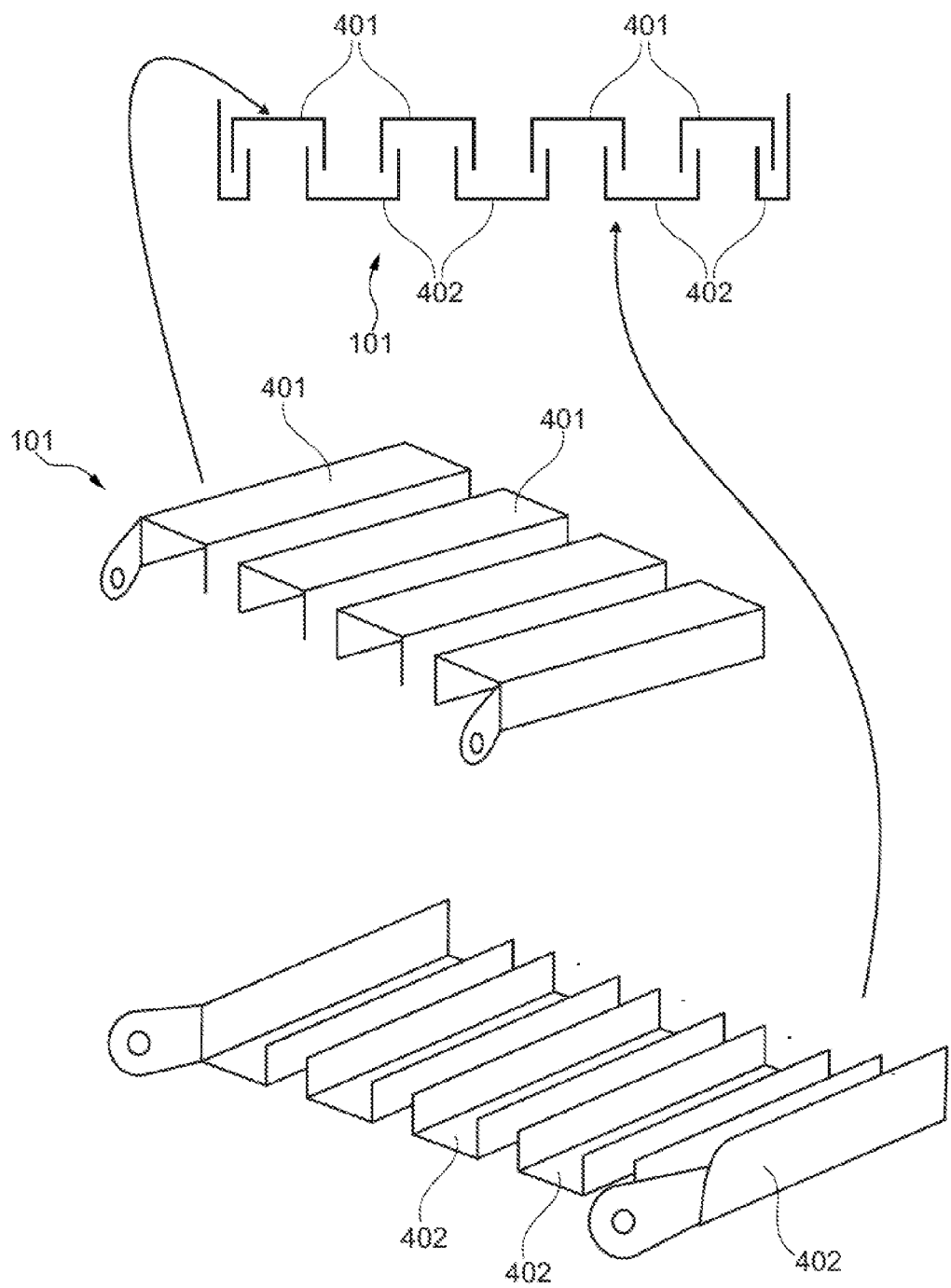

FIG. 5 shows a further profile separator 101 that comprises several profile top parts 401 and several profile bottom parts 402. The upper right-hand part of FIG. 5 shows a cross section of the shown profile separator 101.

Figure 6A:
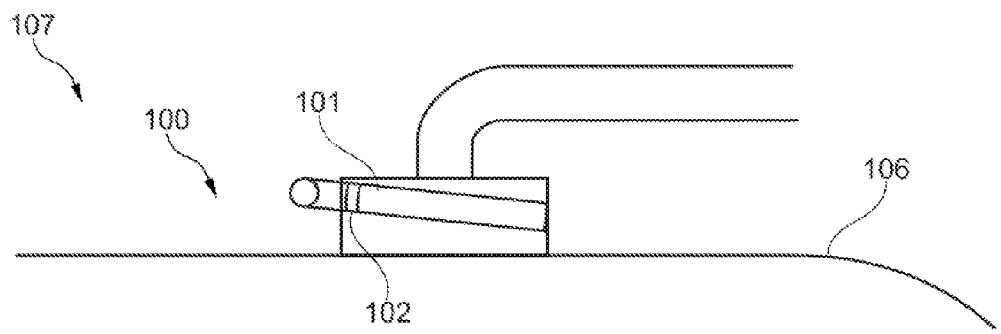
FIG. 6a to FIG. 6c show a diagrammatic two-dimensional view of a separation device according to an embodiment.
Figure 6B:
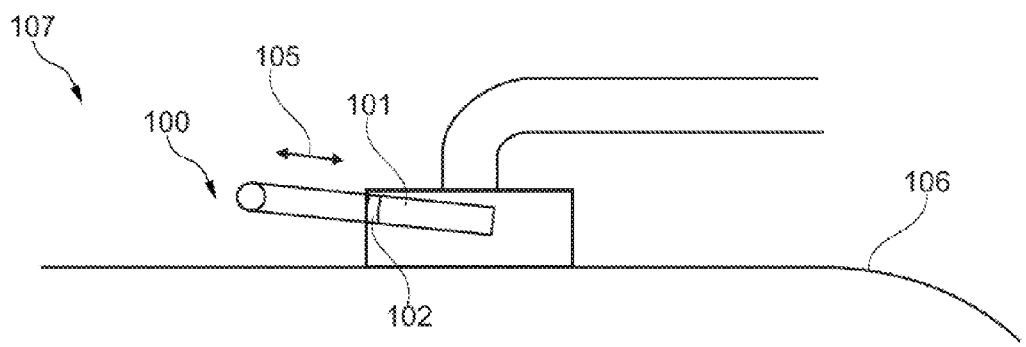
Figure 6C:
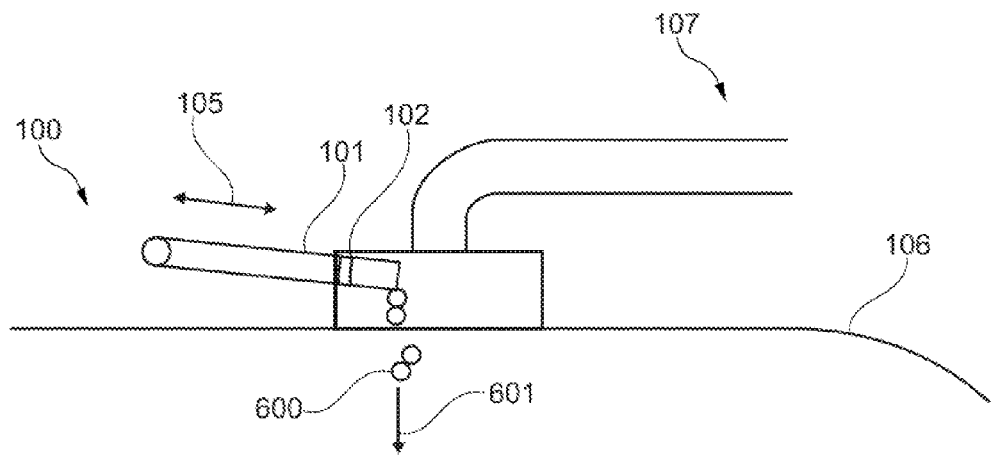

FIG. 6a thru 6c show a vacuum toilet system 107 with a wastewater collection tank 106 and a separation device 100 according to a further embodiment. The three successive figures show the separation device 100 in a time sequence while the relative movement 105 is carried out.

In this exemplary embodiment the profile separator 101 is pulled from its mechanical mount for example manually or automatically, as a result of which the deposition regions (not shown) are cleaned by mechanical contact with the wiping device 102. The initial pulling out is shown in FIG. 6b. The end position of the profile separator is shown in FIG. 6c, which position is also referred to as the cleaning position. The diagram shows that the non-gaseous constituent parts 600, which were previously deposited in the profile separator, fall into the wastewater collection tank 106 as a result of gravity.

Figure 7:
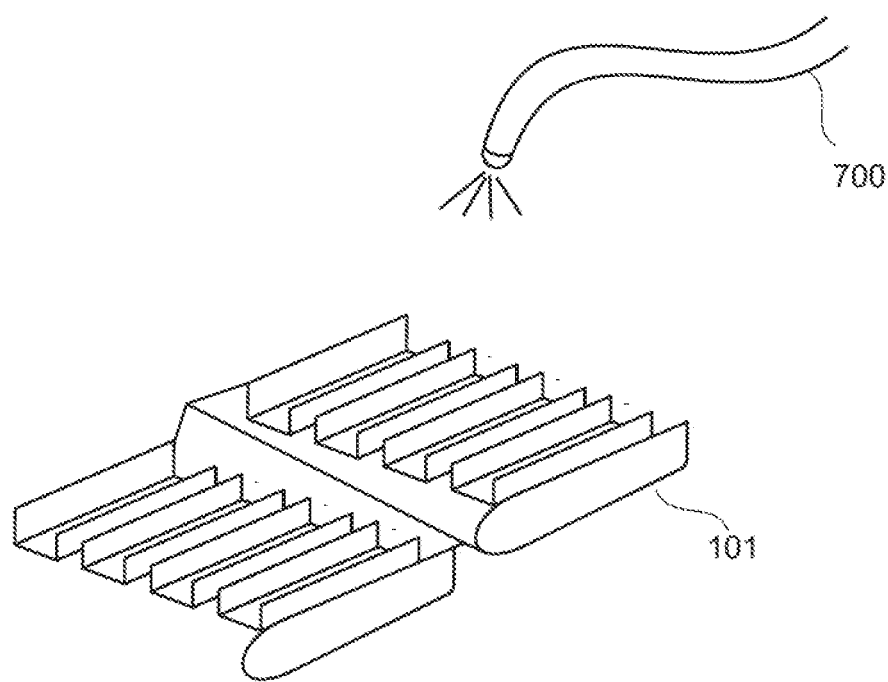
FIG. 7 to FIG. 10 show diagrammatic two-dimensional views of various profile separators that form part of a separation device according to an embodiment.

FIG. 7 shows a profile separator 101 which in a folded-out state, if desired, can also be additionally cleaned by an additional cleaning device 700.

Figure 8:
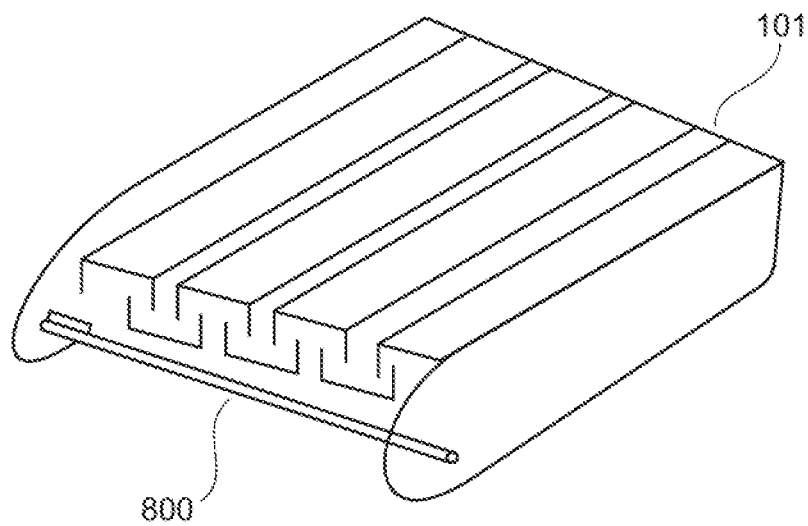

FIG. 8 shows the profile separator 101 of FIG. 7 in a folded-in state, as a result of which the handle 800 is visible.

Figure 9:
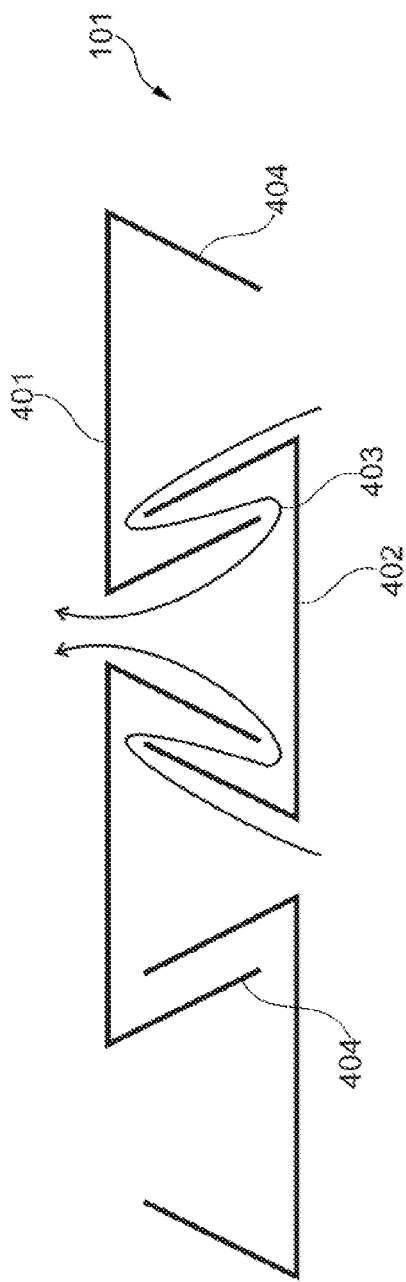
Figure 10:
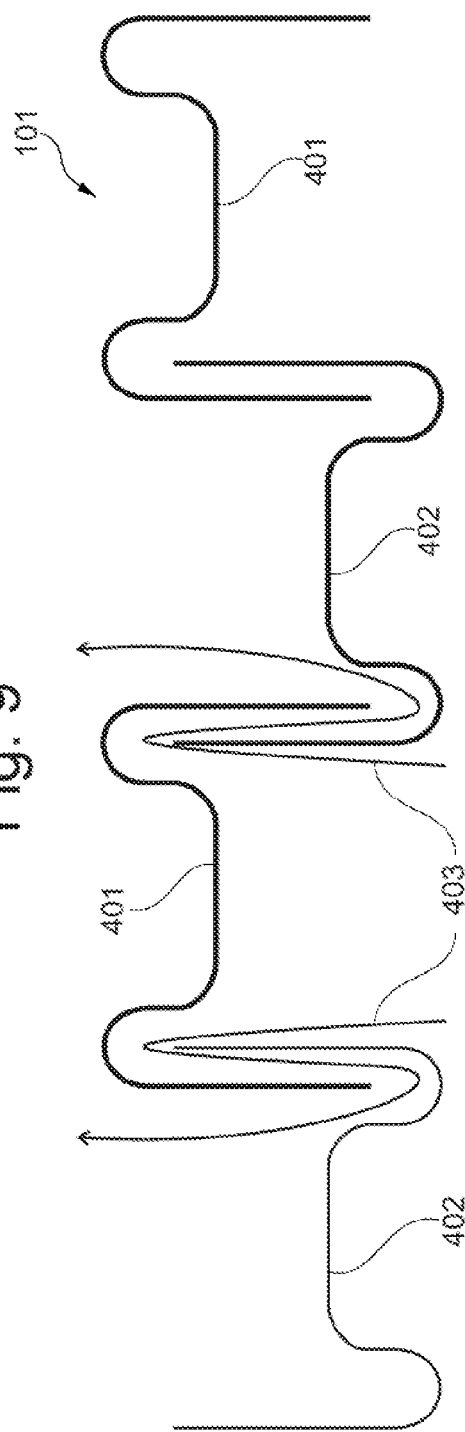

The previously shown profile top parts and profile bottom parts comprised a U-profile. In contrast to this, FIG. 9 and FIG. 10 show various profile shapes that can be used in the profile separator according to the embodiments. The profile separator 101 shown in FIG. 9 also comprises several profile top parts 401 and several profile bottom parts 402. They are also joined in such a manner that a relief-like flow channel 403 is formed. In this arrangement the limbs 404 of the profile top parts and profile bottom parts in each case comprise inclines at an identical angle. This angle is other than 90°.

In contrast to this, FIG. 10 shows the profile separator 101, which also comprises several profile top parts 401 and several profile bottom parts 402. Here again, a flow channel 403 is provided for deflection of the flow, which flow channel 403 both in the exemplary embodiment of FIG. 9 and in the exemplary embodiment of FIG. 10 twice enforces a reversal in direction by at least approximately 180° of the flow. In this and in any other exemplary embodiment a profile separator is used, which profile separator may also be referred to as a baffle separator, in which the separator represents a barrier to the flow, because several times a deflection of the flow may need to take place.

Figure 11:
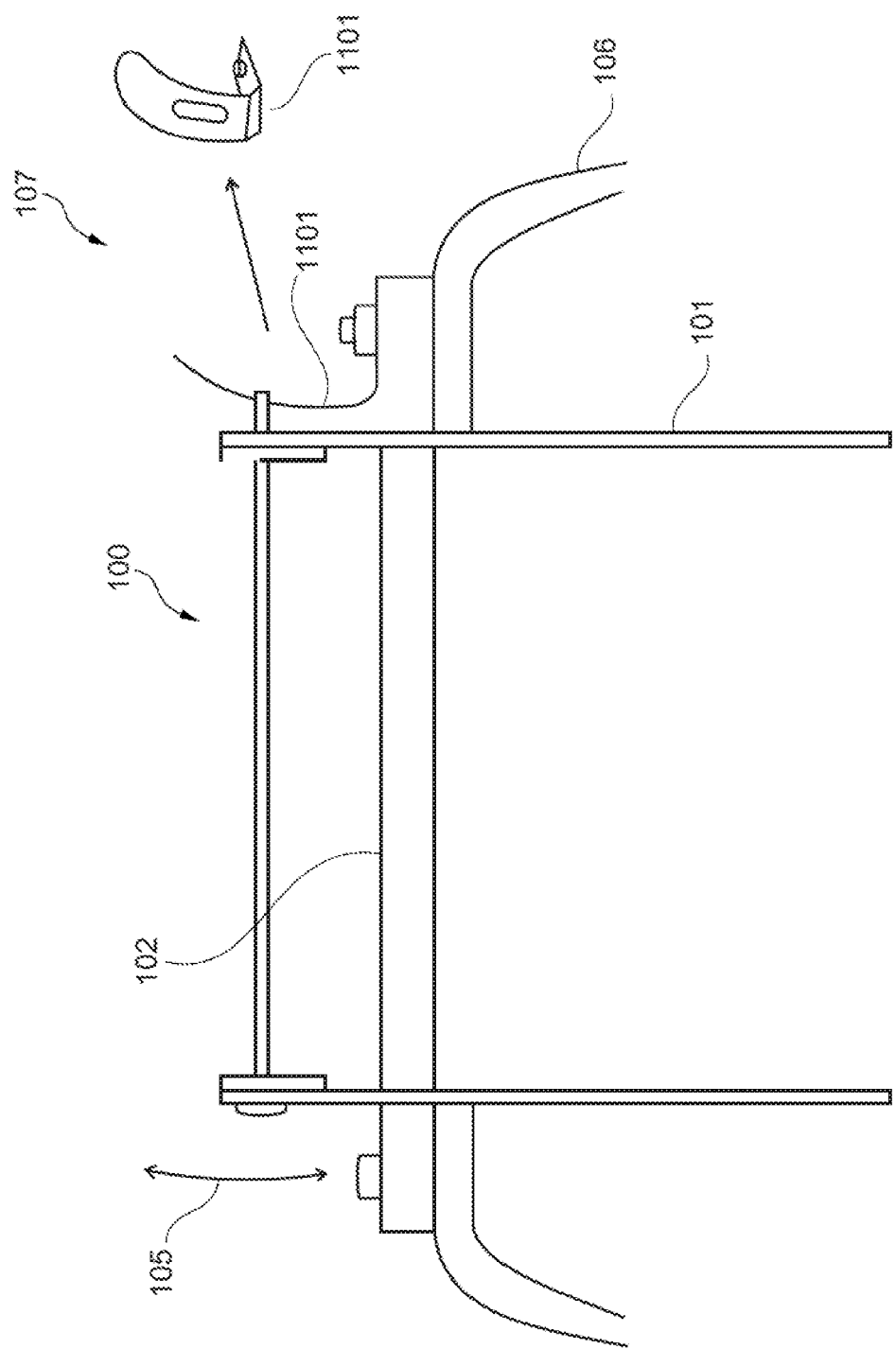
FIG. 11 shows a diagrammatic two-dimensional view of a separation device according to an embodiment.

FIG. 11 shows a vacuum toilet system 107 with a separation device 100 and a wastewater collection tank 106 with a profile separator 101 and a separation device 100 which, for example, as described above, may be designed as a die. In this exemplary embodiment, too, the profile separator may be pulled out along the axis towards the top in the illustration so that the relative movement 105 can be carried out, so that, by means of wiping against the wiping device, the deposited parts are removed. In this arrangement the right-hand part of FIG. 11 shows the quick-locking spring 1101. The separation device is affixed to the wastewater collection tank.

Figure 12:
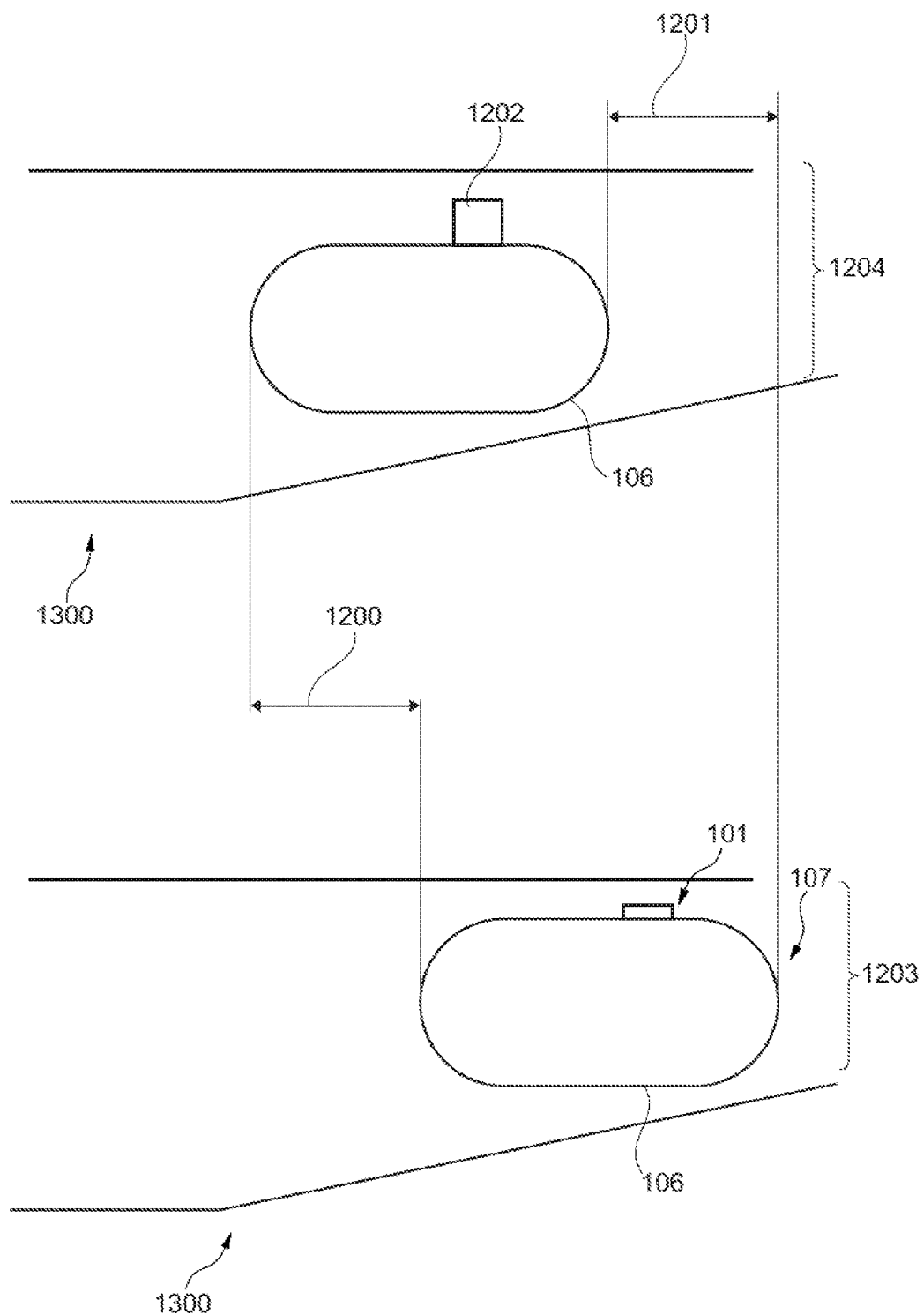
FIG. 12 shows a diagrammatic two-dimensional view of a comparison between a wastewater collection tank according to the state of the art with a wastewater collection tank with a separation device according to an embodiment.

The upper region of FIG. 12 shows a cross section of an aircraft 1300 with a wastewater collection tank 106 that comprises a filter 1202. The lower part of FIG. 12 shows a cross section of an aircraft 1300 that comprises a vacuum toilet system 107 according to an embodiment. The diagram shows a separation device 100. The diagram further shows that, as a result of the lower height 1203 required by a vacuum toilet system 107 according to an embodiment when compared to the height 1204 of a system from the state of the art, space 1200 can be saved. The required height can, for example, be reduced because as a result of simplified cleaning, no space is required for installation and/or deinstallation of parts.

Wastewater tanks may be accommodated in an aircraft at a location where they do not interfere with the cargo space. However, because of their size they may not be placed as far aft as desired. Consequently, usually some space remains between the rear end of the wastewater tank and the so-called pressure bulkhead (end of the pressurized fuselage of the aircraft), which space may not be used any further because of restricted accessibility. However, if tanks are lower, they can be slid further aft, and thus the hitherto unused space up to the pressure bulkhead can be somewhat better used. Consequently, space becomes available in front of the tanks, which can now, for example, be used as cargo space. Thus, the embodiments may provide for additional space in the aircraft, which can be used in an economic manner.

Figure 13:
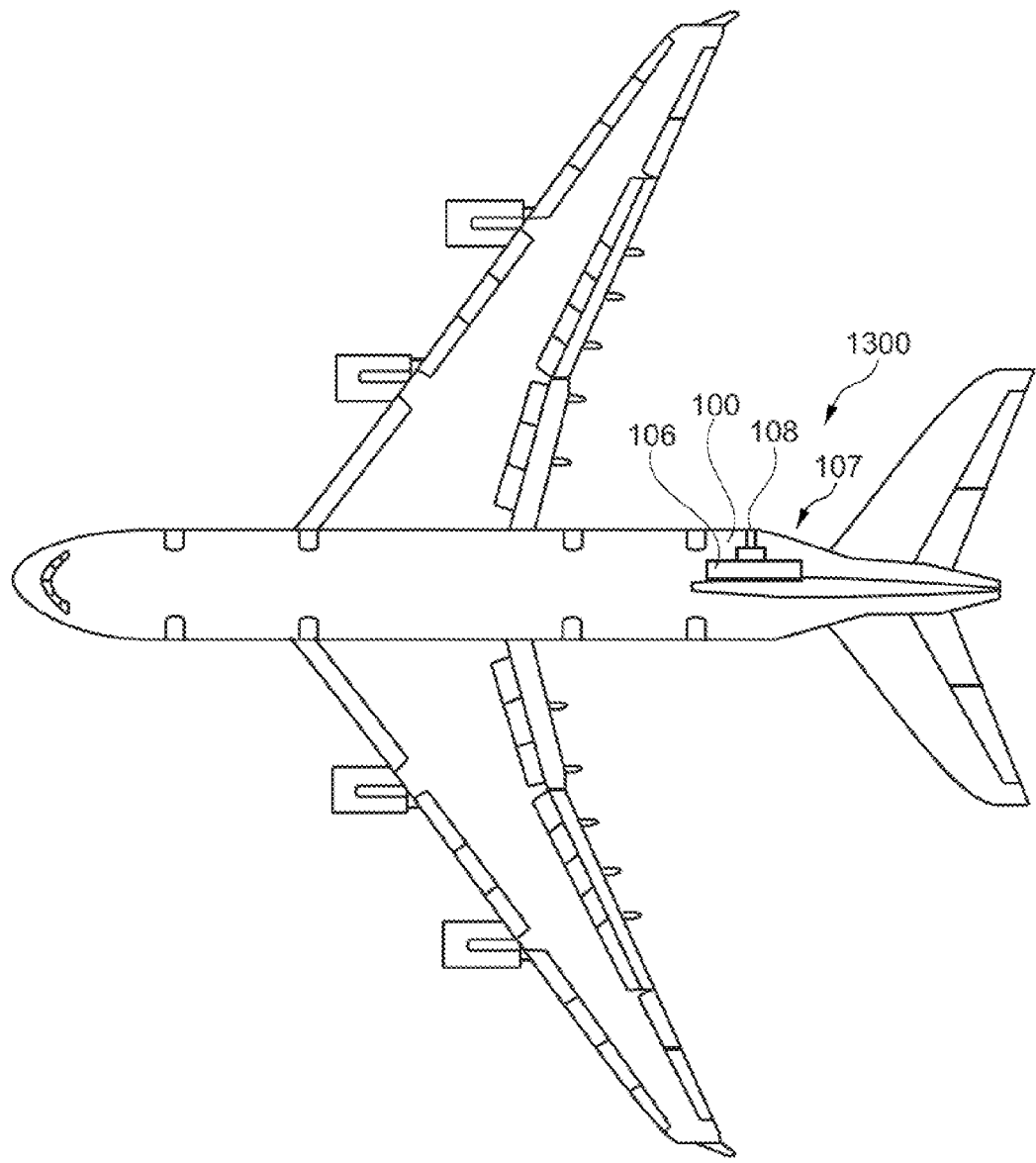
FIG. 13 shows a diagrammatic two-dimensional view of an aircraft with a vacuum toilet system according to an embodiment.

FIG. 13 shows an aircraft 1300 according to a further embodiment with a vacuum toilet system 107 that comprises a wastewater collection tank 106 and a separation device 100. Furthermore, the outflow line 108 is shown, by which outflow line 108 gas is channeled from the wastewater collection tank to the aircraft skin, where it can be expelled to the ambient air.

Figure 14:
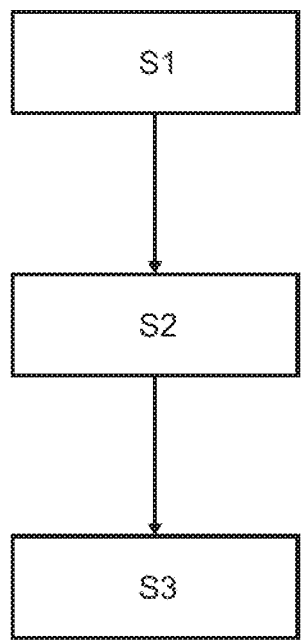
FIG. 14 and FIG. 15 show various flow charts of methods according to embodiments.

FIG. 14 shows a flow chart of a method for cleaning a profile separator in a vacuum toilet system of an aircraft. In a first step S1 a profile separator on a wastewater collection tank of a vacuum toilet system in an aircraft is provided. In this arrangement the profile separator is designed for separating gaseous from non-gaseous constituent parts of toilet wastewater in the aircraft. In step S2 a wiping device is provided. Subsequently, relative movement between the profile separator and the wiping device in the installation position of the profile separator and the wiping device is caused, and consequently non-gaseous constituent parts deposited on the profile separator are removed, by the wiping device, from said profile separator.

In other words, because relative movement between the profile separator and the wiping device is possible, and because there is mechanical interference between the profile separator and the wiping device, a method is provided that makes for significantly simpler and faster cleaning of a profile separator of a vacuum toilet system in aircraft. This may result in a significant reduction in maintenance expenditure. No disposable filters are necessary.

According to a further embodiment, the method comprises the following further steps: releasing the safety catch of the separation device, in particular of the profile separator; pulling the profile separator to a certain end stop; sliding the profile separator in up to a further end stop; securing the separation device, in particular securing the profile separator. According to the method it is no longer necessary to undo a V-clamp, which overall results in reduced maintenance expenditure in relation to the vacuum toilet system.

Figure 15:
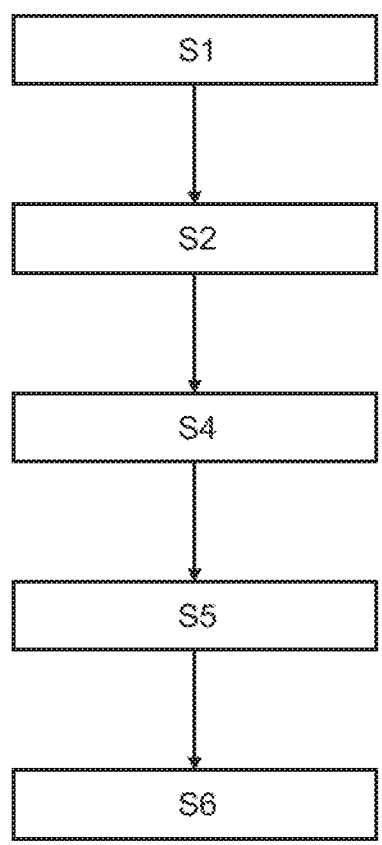

FIG. 15 shows a further flow chart of a method according to a further embodiment. In this arrangement the step S3 has been replaced by the following steps S4 to S6. In a first step S4 the profile separator is pulled out from the wastewater collection tank. At the same time the step S5 takes place, in which wiping of deposited non-gaseous constituent parts from the profile separator takes place as a result of the mechanical contact between the profile separator and the wiping device. In the last step S6 of this embodiment the profile separator is slid into the wastewater collection tank.

It should be noted that the term "comprising" does not rule out a plurality. Let it further be noted that features described with reference to one of the above exemplary embodiments can also be used in combination with other features of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A separation device for a vacuum toilet system of an aircraft, the separation device comprising:
   a wiping device; and
   a profile separator configured to:
      separate gaseous from non-gaseous constituent parts of toilet wastewater in the aircraft; and
      enable a relative movement between the profile separator and the wiping device, and
   wherein as a result of the relative movement, the non-gaseous constituent parts separated by the profile separator are removed from the profile separator by the wiping device.

2. The separation device of claim 1,
   wherein the profile separator comprises a plurality of deposition regions configured to deposit the non-gaseous constituent parts,
   wherein the wiping device comprises a carrier, and
   wherein during the relative movement, a mechanical contact is established between the carrier and the plurality of deposition regions of the profile separator to remove the non-gaseous constituent parts from the profile separator.

3. The separation device of claim 1, wherein a shape of the wiping device is designed as a die relative to the profile separator.

4. The separation device of claim 1,
wherein the separation device comprises a housing, and
wherein the profile separator and the wiping device are arranged in the housing.

5. The separation device of claim 4,
wherein the wiping device is associated with the housing, and
wherein the profile separator is configured to slide relative to the housing and to the wiping device in order to carry out the relative movement.

6. The separation device of claim 1,
wherein the profile separator comprises a profile top part with a first relief-like surface,
wherein the profile separator comprises a profile bottom part with a second relief-like surface, and
wherein the profile top part and the profile bottom part are joined to form a relief-like flow channel.

7. The separation device of claim 6,
wherein the profile top part and the profile bottom part are held only by one end while free on an opposite end, and
wherein the profile top part and the profile bottom part are connected on the one end by a rotational axis so that the profile top part and the profile bottom part are configured to folded out and folded in.

8. The separation device of claim 7,
wherein the separation device is configured such that the opposite end of the profile top part and the profile bottom part are configured to pulled through the wiping device to carry out the relative movement.

9. The separation device of claim 1, furthermore comprising a handle, and
wherein the separation device is configured such that by pulling on the handle the relative movement is carried out between the profile separator and the wiping device.

10. A vacuum toilet system for an aircraft, the vacuum toilet system comprising:
a separation device, comprising:
a wiping device; and
a profile separator configured to:
separate gaseous from non-gaseous constituent parts of toilet wastewater in the aircraft; and
enable a relative movement between the profile separator and the wiping device, and
wherein as a result of the relative movement, the non-gaseous constituent parts separated by the profile separator are removed from the profile separator by the wiping device; and
a wastewater collection tank having a housing that is firmly affixed to the separation device, and
wherein the profile separator is slidably arranged within the separation device.

11. The vacuum toilet system of claim 10, further comprising a quick-locking spring configured to secure the profile separator against unintended movement.

12. A method for cleaning a profile separator in a vacuum toilet system of an aircraft, the method comprising:
providing the profile separator at a wastewater collection tank of the vacuum toilet system in the aircraft; the profile separator is configured to separate gaseous from non-gaseous constituent parts of toilet wastewater in the aircraft;
providing a wiping device; and
causing relative movement between the profile separator and the wiping device in an installation position of the profile separator and the wiping device, so that with the wiping device, the non-gaseous constituent parts are removed from the profile separator.

13. The method of claim 12,
wherein the causing the relative movement comprises:
pulling the profile separator out from the wastewater collection tank;
simultaneous wiping of deposited non-gaseous constituent parts from the profile separator as a result of mechanical contact between the profile separator and the wiping device; and
pushing the profile separator into the wastewater collection tank.

14. An aircraft, comprising:
a vacuum toilet system;
a separation device for the vacuum toilet system, comprising:
a wiping device; and
a profile separator configured to:
separate gaseous from non-gaseous constituent parts of toilet wastewater in the aircraft;
enable a relative movement between the profile separator and the wiping device, and
wherein as a result of the relative movement, the non-gaseous constituent parts separated by the profile separator are removed from the profile separator by the wiping device; and
a wastewater collection tank having a housing that is firmly affixed to the separation device, and
wherein the profile separator is slidably arranged within the separation device.

15. The aircraft of claim 14, further comprising a quick-locking spring configured to secure the profile separator against unintended movement.

\* \* \* \* \*